United States Patent Office 2,732,883
Patented Jan. 31, 1956

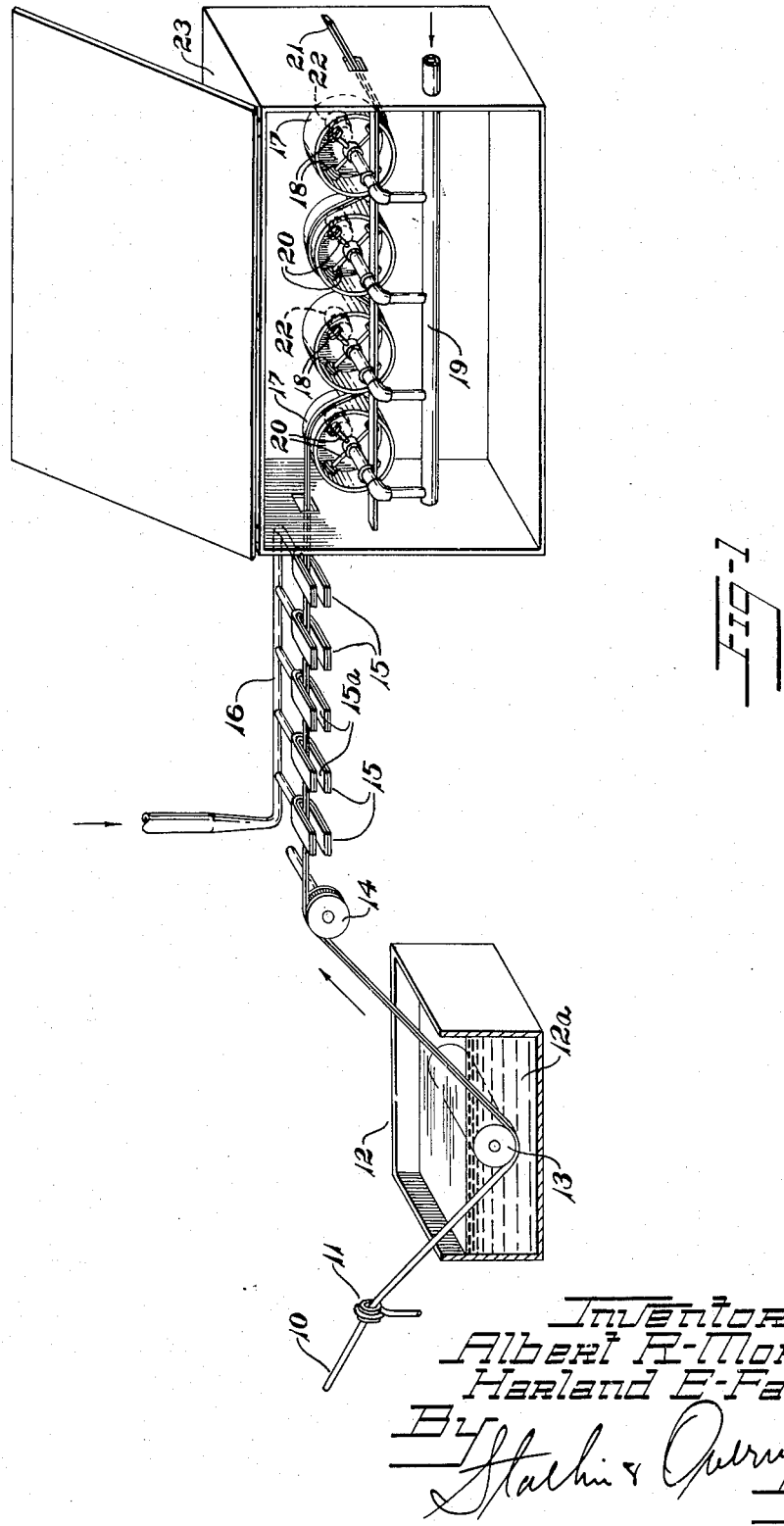

2,732,883

METHOD OF MAKING TWINE AND APPARATUS THEREFOR

Albert R. Morrison and Harland E. Fargo, Newark, Ohio, assignors to Owens-Corning Fiberglas Corporation, Toledo, Ohio, a corporation of Delaware Application May 10, 1952, Serial No. 287,222

15 Claims. (Cl. 154—1.7)

This invention relates to twine and, more specifically, twine of glass fibers such as baler or other similar twines.

In the past, baler and binder twines have been produced from natural fibers such as hemp, sisal, and other like fibers. The supply of these natural fibers has been a problem at times over the past years because of wars and economic depression periods. The natural fibers have been short in supply, and the need has arisen for fibers which are plentiful and can be supplied by local industries instead of depending upon foreign suppliers which are frequently affected by world, economic, and political situations.

Twines have been made of siliceous fibers, either alone or with other materials including paper or natural fibers. In producing twines comprising either all glass or glass and another material, it has been found that the treatment of the twine with fillers and dyes or the like is a very critical part of the production of the glass twine. It is necessary to use the proper treatment of the glass fibers in order to provide the requisite knot strength, tensile strength, abrasion resistance, lubricity, and outward appearance.

It is an object of this invention to provide an improved glass twine having excellent knot strength, abrasion resistance, and handleability along with the attendant high tensile strength inherent in such a twine.

It is an object of this invention to provide a method of making an all glass twine having superior properties at increased production rates.

It is also an object of this invention to provide apparatus for so producing a baler twine.

Other objects will be apparent from the specification and claims and from the drawing which illustrates apparatus of the invention.

This invention comprises a method of treating all glass twine comprising a plurality of strands of fibrous glass with the proper emulsion or solution of coating ingredients and then drying and fusing the coating in a two-stage process as will be described.

The apparatus of this invention is illustrated in the single figure of the drawings wherein dipping and heat treating apparatus is shown schematically in a perspective view.

The apparatus comprises a guide 11 situated adjacent the dip tank 12 in which is contained a bath 12a of suitable coating material. A submerged roll 13 is in tank 12, and guide roll 14 is situated above and at one side of the tank. A bank of radiant burners 15—15 is supplied with fuel by the manifold 16. Each U-shaped radiant burner has a refractory liner 15a. A series of rolls 17—17 are mounted one beside the other and within these rolls mounted on spindles 20—20 are radiant burners 18—18 which heat the rotatable rolls 17—17. The radiant burners 18—18 are supplied with fuel by manifold 19 which is connected to a suitable fuel source, not shown. Rolls 17—17 are mounted upon suitable bearings 22—22.

In operating this apparatus, a strand 10 comprising a suitable number of individual strands having from 100 to 200 or more individual fibers each is strung through guide 11 and thence downwardly through the coating bath and under roll 13, and then is drawn upwardly over roll 14 and through radiant burners 15—15. A relatively flat ribbon of material is drawn from the tank 12. The ribbon is then pulled by hand through the inlet opening of oven 23 and over and under alternate rolls 17—17 and then out through the outlet opening of box 23. After the ribbon is so threaded, the radiant burners 15—15 and 18—18 are lighted and the ribbon 21 emerging from the oven 23 is started into a twisting and balling apparatus, the latter not shown.

Radiant burners 15—15 flash off the greater proportion of the water of the coating solution or emulsion. The temperature within these radiant burners is from about 1200° to 1500° F. and preferably from 1250° to 1450° F. Rolls 17—17 then heat the ribbon upon which has been deposited the suitable coating ingredients to temperatures of from 400° to 600° F. and preferably from about 450° to 550° F. to completely dry and fuse these ingredients into a suitable coating upon the ribbon 21 which is twisted and formed into a suitable package of twine, as desired.

A suitable means for controlling the amount of coating material upon the ribbon may be used. For instance, the coated material may be withdrawn from the tank and directed through a stripping die or a pair of squeeze rolls in order to remove excess coating material from the ribbon. The means for controlling the coating material to glass ratio may be a part of or an attachment for the tank 12.

A number of suitable baths may be used within tank 12, which tank may or may not be heated depending upon the properties of the bath to be used. These coating materials give the twine some integrity and bind together the individual strands and fibers within the strands in order to give a suitable finished product. The unified strands are better suited for subsequent drying and twisting operations, and the coating materials also impart the requisite properties of increased knot strength, stiffness, integrity, and surface lubricity.

These coating materials preferably comprise a mixture of a resinous material, either thermoplastic or thermosetting, a suitable polymeric organic rubber material, and a lubricant which may or may not be compatible with the mixture of the resinous and rubbery components. When a dried deposit of a coating material is placed upon the fibrous glass twine, a lubricant which is compatible with the mixture of resinous and rubbery components will remain in the dried deposit while a lubricant which is incompatible will tend to bleed out to the surface of the dried deposit and will provide the necessary lubrication at the surface of the dried deposit only.

The resinous component may be a thermosetting resin such as those typified by condensation products prepared by condensing a phenol and aldehyde in the presence of a catalyst and including phenol formaldehyde resins, or such a phenol formaldehyde resin extended with a thermoplastic resinous material including high melting resinous materials such as pine rosin derivatives. Phenol formaldehyde resins extended with a pine rosin derivative product are described in U. S. Patents 2,324,758 and 2,276,304 issued to Voden and Hunter, respectively. The resinous component may also consist of the pine rosin derivative product alone.

The rubber latex used is preferably a dispersion of a rubber-like polymerization product. However, any dispersion of a sulfur-vulcanizable polymeric organic material including crude rubber and synthetic rubbery polymeric materials may be used. The rubber component may be any vulcanizable rubber latex including such naturally occurring crude rubbers as caoutchouc, which is essentially a rubbery polymer of isoprene and the like or such synthetic rubbers as rubbery polymers of the open chain conjugated dienes having from four to eight carbon atoms such as the butadiene-1,3 hydrocarbons which include butadiene-1,3, isoprene, 2,3-dimethyl butadiene-1,3, 1,4-dimethyl butadiene-1,3, and the like; or copolymers of these and similar materials with each other or with such copolymerizable monomeric materials as isobutylene, styrene, acrylonitrile, methylacrylate, methylmethacrylate, ethylacrylate, ethylmethacrylate, and similar materials.

The lubricants may be such materials as the metallic salts of the fatty acids and including aluminum, calcium, magnesium, potassium, zinc, and sodium stearate or other similar metal salts of other fatty acids, or materials such as graphite, silicone products including the oily liquids or pastes, and others may be used.

The proportions of the three components may be varied widely. However, the resinous and rubbery components make up a greater proportion of the total solids content of the dipping bath, and the lubricant is a very minor proportion thereof.

Generally the resinous and rubbery components are present in the dipping bath in substantially equal portions and the lubricant is preferably from about 1% to 5% of the total solids content.

A suitable coating mixture is prepared as follows: 750 parts of an aqueous emulsion (40% solids) of the residue remaining after separation of refined rosin from the resinous extract of pinewood is mixed with 750 parts of a 40-60 butadiene styrene latex (48% solids) and 180 grams of a dispersion of zinc stearate (25% solids) and to this mixture was added 1320 parts of water. The resulting bath has 23.5% total solids, 10% of which is the residue remaining after the separation of refined rosin from the resinous extract of wood, 12% of which is synthetic rubber, and 1.5% of which is zinc stearate.

A twine prepared by dipping the strands of fibrous glass in the dipping bath of Example 1 and cured with the two-step heating apparatus shown in the drawing provides a product having a tensile strength of 450 pounds or greater and very good knot strength and surface lubricity and non-abrading properties. The zinc stearate bleeds out to the surface of the twine where it lubricates the surface of the twine very effectively.

The apparatus of this invention can be operated at very high production rates, the only limitation being not in the apparatus shown in the drawing but rather in the twisting and balling apparatus used, which apparatus is preferably operated at not greater than 135 feet per minute when a twist of one turn per inch is being used. Higher speeds can be used when reduced twist is imparted to the ribbon. Lower speeds can be used if desired; however, with apparatus using burners providing a temperature of from 1200° to 1500° F. and rolls maintained at a temperature of from 400° to 600° F., it is preferable to advance the coated strand at rates greater than 100 feet per minute. Stated in another manner, any point upon the advancing coated strand can be subjected to a temperature of from 1200° to 1500° F. for from about 0.5 to 2 seconds and then to temperatures of from 400° to 600° F. for from about 1 to 8 seconds. Obviously, if lower temperatures are used in the two heating stages, the coated strand can be advanced more slowly so that it is exposed to the heating zones for a greater length of time.

The two-step heating method is advantageous in that the U-shaped burners which provide a temperature of from 1200° to 1500° F. form a skin upon the coating material on the twine, which skin will prevent sticking of the semi-dried product upon the heating rolls used in the second step of the two-step heating method. Heating rolls, the metal surfaces of which may be maintained at a lower temperature of from 400° to 600° F., provide the efficient transfer of heat energy needed to complete the drying and fusing or curing of the coating materials upon the twine. In this two-step process, the radiant burners flash off the greater proportion of the water of the dipping bath and then the heated metallic surfaces complete the polymerization of the resin and drying and fusing of the resin and the elastomer. This two-step process is a high-production rate process which is well adapted for making commercial twine. It is a fast method which cannot be obtained by using either hot gas or hot metallic surfaces alone.

Other advantages of the method and apparatus are these. The apparatus avoids burning or scorching of the resinous component of the dipping bath. The resin and latex mixtures do not tend to stick upon the heating rolls or drums. High rates of production are possible, and with these high rate methods a superior product of higher quality is produced.

Although specific embodiments of the invention have been disclosed, it is not intended to limit the invention thereto. Rather, it is intended that modifications and variations can be made within the spirit and scope of the following claims.

We claim:

1. In a method of producing twine comprising gathering strands of glass fibers from continuous supplies, coating said strands with a mixture of resin and elastomer in an aqueous medium and drying said mixture, a two-step heating and drying process consisting essentially of exposing the coated strand to a temperature of from 1200° to 1500° F. to form a skin upon said coated strand, and exposing said coated strand to a reduced temperature of from about 400° to 600° F. to complete polymerization of said resin and drying of said coated strand.

2. In a method of producing twine comprising continuously gathering fibrous glass strands into a bundle, coating said bundle with a mixture of resin and an elastomer in aqueous medium and drying said mixture, a two-step heating and drying process consisting essentially of exposing the coated bundle to a temperature of from about 1250° to 1450° F. to form a non-tacky skin on the coated bundle, and exposing the coated bundle to a reduced temperature of from 450° to 550° F. to complete the drying and fusing of said mixture.

3. In a method of producing twine comprising continuously gathering fibrous glass strands into an advancing bundle, coating said advancing bundle with an aqueous dispersion of resin and rubber latex and drying said advancing bundle, the steps consisting of suspending a portion of said advancing bundle and then exposing said portion to a high temperature of from 1200° to 1500° F., maintaining said portion at a high temperature to drive off water and form a skin on the coated bundle, and bringing said advancing bundle into contact with a surface maintained at a temperature of from 400° to 600° F. to complete drying of said aqueous dispersion.

4. In a method of producing twine comprising continuously gathering fibrous glass strands into an advancing bundle, coating said advancing bundle with an aqueous dispersion of resin and rubber latex and drying said advancing bundle, the steps consisting of suspending said advancing bundle within a heating zone, exposing said advancing bundle while suspended to a temperature of from 1250° to 1450° F. to form a non-tacky skin on the coated bundle and bringing said advancing bundle into contact with a heated surface at from about 450° to 550° F. to complete the drying of said dispersion.

5. In a method of producing twine comprising continuously gathering fibrous glass strands into an advancing ribbon, dipping said advancing ribbon in an aqueous dispersion of substantially equal parts of a butadiene-styrene rubber latex having 48% solids and an aqueous emulsion having about 40% solids of the residue remaining after separation of refined rosin from the resinous extract of pine wood and from 1 to 5% based on the total solids of a lubricant, and drying said aqueous dispersion to form a coat upon said advancing ribbon, the steps consisting essentially of exposing said ribbon while suspended to a temperature of from 1200° to 1500° F. to form a skin thereon, and bringing said ribbon into contact with a metallic surface maintained at a temperature of from 400° to 600° F. to complete the drying of said dispersion.

6. A method of producing twine consisting essentially of gathering a plurality of fibrous glass strands into an advancing bundle, coating said advancing bundle with a mixture of resin and elastomer in aqueous medium, radiantly heating at a temperature of from 1200° to 1500° F. said advancing bundle to form a skin upon the coating and bringing said advancing bundle into contact with a surface at a temperature of from 400° to 600° F. to dry said coating.

7. A method of producing twine consisting essentially of gathering a plurality of fibrous glass strands into an advancing bundle, coating said advancing bundle with an aqueous dispersion of resin and rubber latex, suspending said advancing bundle, exposing said advancing bundle while so suspended, to a temperature of from 1200° to 1500° F. to form a non-tacky skin thereon and bringing said advancing bundle into contact with a surface maintained at a temperature of from 400° to 600° F. to completely dry said aqueous dispersion.

8. A method of producing twine comprising gathering fibrous glass strands into an advancing ribbon, forming a coat on said advancing ribbon by dipping into an aqueous dispersion of substantially equal parts of a butadiene-styrene rubber latex having 48% solids and an aqueous emulsion having about 40% solids of the residue remaining after separation of refined rosin from the resinous extract of pine wood and from 1 to 5% by weight based on total solids of a lubricant, exposing said advancing ribbon while suspended to a temperature of from 1200° to 1500° F. for from 0.5 to 2 seconds to form a skin upon said coat and bringing said advancing ribbon into contact with a heated metallic surface at from 400° to 600° F. for from 1 to 8 seconds to dry said aqueous dispersion.

9. A method of producing twine comprising gathering fibrous glass strands into an advancing ribbon, forming a coat on said advancing ribbon by dipping into an aqueous bath containing 23.5% total solids including 10% residue remaining after separation of refined rosin from the resinous extract of wood, 12% synthetic rubber, and 1.5% zinc stearate, exposing said advancing ribbon while suspended to a temperature of from 1200° to 1500° F. for from 0.5 to 2 seconds, and bringing said advancing ribbon into contact with heated metallic rolls for from about 1 to 8 seconds to dry said coat at a temperature of from 400° to 600° F.

10. Apparatus for producing twine comprising means for coating an advancing bundle of fibers with an aqueous mixture of coating materials, means for suspending said advancing bundle, a bank of U-shaped radiant burners adapted for receiving said advancing bundle while so suspended, and a plurality of heated, side-by-side rolls for drying said advancing bundle.

11. Apparatus for producing twine comprising means for coating an advancing textile strand with an aqueous mixture of coating materials, means for horizontally suspending said advancing strand, a plurality of side-by-side U-shaped radiant burners adapted for receiving said strand while so suspended, and a plurality of side-by-side, heated rolls adapted for contact heating of said strand.

12. Apparatus for producing twine comprising means for coating an advancing bundle of fibers with an aqueous coating mixture, U-shaped radiant burners for flash heating the advancing coated bundle of fibers, and heated rolls for drying said advancing coated bundle of fibers.

13. Apparatus for producing fibrous glass twine comprising coating means for applying an aqueous mixture to an advancing bundle of fibers, radiant burners for flash heating the coated advancing bundle of fibers, said radiant burners being capable of providing a temperature of from 1200° to 1500° F., and heated rolls for heating and drying said coated advancing bundle of fibers, said rolls being capable of maintaining a temperature of from 400° to 600° F.

14. Apparatus for treating fibrous products comprising means for coating an advancing bundle of fibers with an aqueous coating mixture, means for suspending the coated advancing bundle of fibers, a bank of U-shaped radiant burners adapted for receiving and flash heating said coated advancing bundle of fibers, and a plurality of heated rolls for drying said coated advancing bundle of fibers.

15. Apparatus for producing twine comprising means for coating an advancing bundle of fibers with an aqueous coating mixture, U-shaped radiant burners for flash heating the advancing coated bundle of fibers, and means for drying said advancing coated bundle of fibers.

References Cited in the file of this patent

UNITED STATES PATENTS

| | | |
|---|---|---|
| 1,994,057 | Wallach | Mar. 12, 1935 |
| 2,345,541 | Scholze | Mar. 28, 1944 |
| 2,389,459 | Remark et al. | Nov. 20, 1945 |
| 2,496,911 | Green | Feb. 7, 1950 |
| 2,498,338 | Martin | Feb. 21, 1950 |
| 2,550,465 | Gorski | Apr. 24, 1951 |
| 2,625,498 | Koch | Jan. 13, 1953 |
| 2,633,428 | Klug | Mar. 31, 1953 |